United States Patent [19]
Nishimoto

[11] Patent Number: 6,046,732
[45] Date of Patent: Apr. 4, 2000

[54] METHOD OF ALLOWING USERS TO ENTER CHARACTERS INTO ELECTRONIC EQUIPMENT BY USING CURSOR KEY AND DISPLAYING USER-ENTERED CHARACTERS

[75] Inventor: Hajime Nishimoto, Tokyo, Japan

[73] Assignee: Mitsubishi Denki Kabushiki Kaisha, Tokyo, Japan

[21] Appl. No.: 09/054,478

[22] Filed: Apr. 3, 1998

[30] Foreign Application Priority Data

Dec. 18, 1997 [JP] Japan ................................ 9-349839

[51] Int. Cl.[7] ........................................................ E01R 13/00
[52] U.S. Cl. ........................... 345/168; 345/141; 345/145; 345/169; 345/173
[58] Field of Search ........................... 345/145, 146, 345/141, 156, 168, 169, 160, 173

[56] References Cited

U.S. PATENT DOCUMENTS

| | | | |
|---|---|---|---|
| 4,458,238 | 7/1984 | Learn | 345/169 |
| 4,885,574 | 12/1989 | Negishi et al. | 345/168 |
| 5,430,436 | 7/1995 | Fennell | 345/169 |
| 5,598,487 | 1/1997 | Hacker et al. | 345/169 |
| 5,661,476 | 8/1997 | Wang et al. | 345/169 |
| 5,870,110 | 2/1999 | Mallory | 345/168 |

*Primary Examiner*—Bipin Shalwala
*Assistant Examiner*—Vincent E. Kovalick
*Attorney, Agent, or Firm*—Rothwell, Figg, Ernst & Kurz

[57] ABSTRACT

The screen of a display such as a liquid crystal display can be divided into an input data display region comprised of at least one line, in which characters selected by a user are displayed, and a software keyboard display region comprised of three lines, in which a software keyboard is displayed. A dot pattern showing a boundary between the input data display region and the software keyboard display region is also provided. A blank dot pattern is further provided between any two adjacent rows of keys or characters on the on-screen software keyboard so that the three rows of keys or characters on the on-screen software keyboard are spaced. The user can select a character displayed in the software keyboard display region by using a cursor key and an OK key.

4 Claims, 5 Drawing Sheets

METHOD OF ALLOWING USERS TO ENTER CHARACTERS INTO ELECTRONIC EQUIPMENT BY USING CURSOR KEY AND DISPLAYING USER-ENTERED CHARACTERS

BACKGROUND OF THE INVENTION

1. Field of the Invention

The present invention relates to a method of allowing a user to enter characters into electronic equipment such as a mobile telephone or a computer by selecting a character on a software keyboard displayed on a display screen of the electronic equipment using a cursor key, and displaying the selected character on the display screen.

2. Description of the Prior Art

Some mobile telephones have a function of storing in a memory telephone numbers each associated with its destination name such as a person's name or a company's name, and a function of searching for a telephone number from its corresponding destination name when a user makes a call. When a user uses such functions, the user needs to enter a destination name as well as a corresponding telephone number. In such a case, since a number of keys cannot be arranged on the control panel of such a mobile telephone, the user has to enter the destination name to the mobile telephone through the use of a ten-button keypad found on the control panel intended for typing in a telephone number.

Referring now to FIG. 9, there is illustrated a plane view showing the control panel of a prior art mobile telephone through which a user can type in letters, and on which user-entered letters can be displayed, as disclosed in for example Japanese Patent Application Laying Open (KOKAI) NO. 6-348383. In the figure, reference numeral 101 denotes the main body of a mobile telephone, 102 denotes the display screen of a display such as a liquid crystal display, and 103 denotes a keypad. The keypad 103 includes a numeric keypad 104 containing ten number keys to each of which two or more letters of the alphabet and letters of the Japanese alphabet are assigned. A table indicating a correspondence between each of the ten number keys and two or more letters of the alphabet and letters of the Japanese alphabet assigned to each of the ten number keys is stored in a ROM in which a control program for controlling a built-in CPU is also stored.

Referring next to FIG. 10, there is illustrated a block diagram showing the internal structure of the prior art mobile telephone shown in FIG. 9. In the figure, reference numeral 110 denotes an RF circuit connected to an antenna 111, 112 denotes a central processing unit or CPU connected to the RF circuit 110 by way of an input/output or I/O circuit 113, 114 denotes a ROM in which a control program for controlling the CPU 112 is stored, 115 denotes a RAM in which data needed for the control program to control the CPU 112 are stored, 116 denotes a liquid crystal display control circuit for displaying data from the CPU 112 on the screen of a liquid crystal display 117, and 118 denotes a font ROM for storing font data to be furnished to the liquid crystal display control circuit 116. The keypad 103 is connected to the CPU 112 by way of another input/output or I/O circuit 119. The mobile telephone further comprises an audio circuit, not shown, including a microphone, a speaker, and so on.

As shown in FIG. 9, three letters "A", "B", and "C" of the alphabet are assigned to the number key "2", on the numeric keypad 104. When the number key "2" is pressed once in character input mode, the letter "A" is displayed on the screen 102 of the liquid crystal display. When the number key "2" is pressed twice in character input mode, the letter "B" is displayed on the screen 102 of the liquid crystal display. When the number key "2" is pressed three times in character input mode, the letter "C" is displayed on the screen 102 of the liquid crystal display. In this manner, each time the user presses the number key "2", the letter displayed on the screen 102 is changed in the order of "A", "B", and "C". In order to select a desired one from the letters and then confirm the selection, the user should wait a predetermined time or press another key while a desired one of the letters is displayed. For example, in order to enter and display the letter "C" on the screen, the user has to press the number key "2" three times and then press another key to confirm the selection, that is, the user needs four sequential key touches.

Accordingly, a problem with the prior art method of allowing a user to enter characters into electronic equipment is that a large number of key operations is needed when the user enters characters. In addition, a second problem is that users are subject to great stress when entering characters into electronic equipment because they have to enter characters while looking at characters marked on each of the number keys and user-entered characters displayed on the screen 102 alternately.

Referring next to FIG. 11, there is illustrated a plane view showing the control panel of another prior art mobile telephone through which a user can type in letters of the alphabet, and on which user-entered letters can be displayed, as disclosed in for example Japanese Patent Application Laying Open (KOKAI) NO. 7-322358. In a display unit 107 of the main body 106 of the mobile telephone, there are provided a letter display region 107a in which selectable letters are displayed, and an input region 107b in which user-entered (or user-selected) letters are displayed. If a user presses a number key on a numeric keypad 108, letters associated with the pressed number key are displayed in the letter display region 107a. After that, the user can select a desired letter from among the characters on-screen and display the desired letter in the input region 107b by moving a cursor 107c to the position of the desired letter and then pressing a SEL key on an operational keypad 109 so as to confirm the selection of the desired letter under the cursor 107c.

While the user can enter letters into the prior art mobile telephone as the user looks at the display screen, problems with the prior art mobile telephone are that the user has to take extra special care on entering characters because the user has to search for a number key to which a desired character to be entered is assigned in order to manipulate the number key, and the user has difficulty in manipulating keys when entering letters.

SUMMARY OF THE INVENTION

The present invention is made to overcome the above problems. It is therefore an object of the present invention to provide a method of allowing a user to enter characters into electronic equipment by using a cursor key and displaying the user-entered characters on the screen of a display such as a liquid crystal display while looking at the user-entered characters and a software keyboard displayed on-screen, so that the user can easily enter a text into the electronic equipment while recognizing the user-entered characters.

In accordance with the present invention, there is provided a method of allowing a user to enter characters by selecting a character in a software keyboard displayed on a display screen of electronic equipment using a cursor key, and displaying characters selected by the user on the display screen, comprising the steps of: providing an input data display region comprised of at least one line, in which characters selected by the user are displayed, within the display screen; providing a software keyboard display region comprised of three lines, in which the on-screen software keyboard is displayed, within the display screen; and providing a dot pattern showing a boundary between the input data display region and the software keyboard display region.

Preferably, a blank dot pattern is provided between any two adjacent rows of keys or characters on the on-screen software keyboard so that the three rows of keys or characters on the on-screen software keyboard are spaced.

In accordance with a preferred embodiment of the present invention, each line of the display screen consists of dot patterns of N pixels high, wherein in performing the providing steps. Within a first line of the software keyboard display region, a dot pattern of 1 dot high showing the boundary between the input data display region and the software keyboard display region is displayed at the top of the first line of the software keyboard display region so that the boundary is adjacent to the input data display region. A first blank dot line of dots of 1 pixel high is provided just under the boundary and a first row of keys or characters on the software keyboard is displayed just under the first blank dot line by using a screen font built up on a matrix of (N−2) dots high by $M_1$ dots wide so that the boundary and the first row of the software keyboard are spaced. Furthermore, within a second line of the software keyboard display region, a second blank dot line of dots of 1 pixel high is provided just under the first line of the software keyboard display region and a second row of keys or characters on the software keyboard is displayed just under the second blank dot line by using a screen font built up on a matrix of (N−2) dots high by $M_1$ dots wide so that the first and second rows of the software keyboard are spaced. A third blank dot line of dots of 1 pixel high is provided just under the second row of the software keyboard. In addition, within a third line of the software keyboard display region, a third row of keys or characters on the software keyboard is displayed just under the third blank dot line by using a screen font built up on a matrix of (N−1) dots high by $M_1$ dots wide so that the second and third rows of the software keyboard are spaced, and a fourth blank dot line of dots of 1 pixel high is provided at the lowermost part of the third line of the software keyboard display region.

In performing the step of providing the input data display region, characters selected by the user can be displayed by using a screen font built up on a matrix of (N−1) dots high by $M_1$ dots wide, and a blank dot line of dots of 1 pixel high is provided at the lowermost part of the input data display region so that characters displayed in the input data display region and the boundary displayed in the software keyboard display region are spaced.

Preferably, the on-screen software keyboard has a key layout which is the same as the QWERTY typewriter layout. The on-screen software keyboard can have three different key layouts: an uppercase alphabetic key layout, a lowercase alphabetic key layout, and a special symbol key layout. The on-screen software keyboard can switch among the three different key layouts in response to a user's manipulation.

Further objects and advantages of the present invention will be apparent from the following description of the preferred embodiment of the invention as illustrated in the accompanying drawings.

BRIEF DESCRIPTION OF THE DRAWINGS

FIG. 6b is a partly enlarged front view showing in detail a layout of a software keyboard illustrated for comparison with the layout of the software keyboard shown in FIG. 6a;

DETAILED DESCRIPTION OF THE PREFERRED EMBODIMENT

Figure 1:
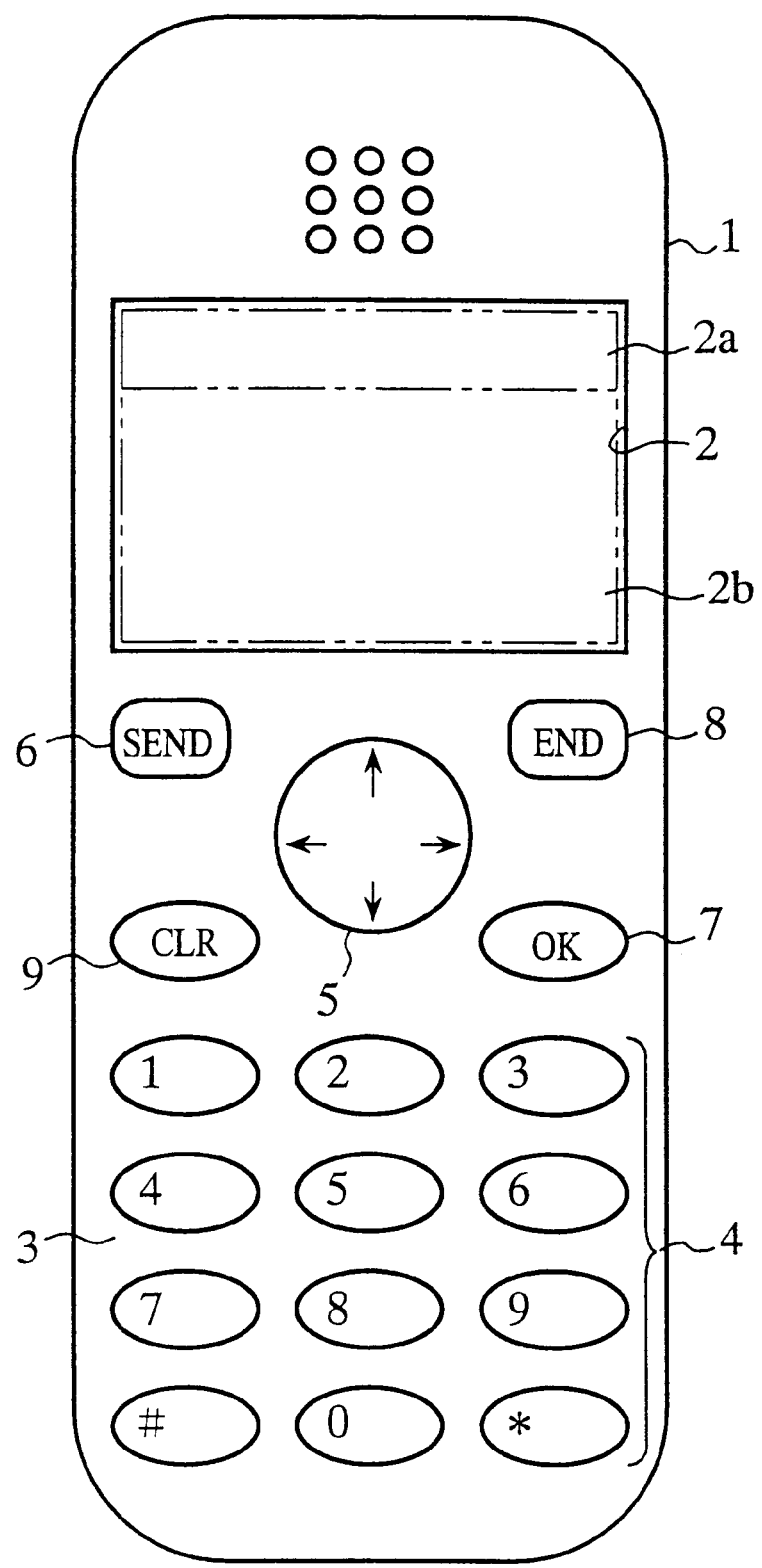
FIG. 1 is a plan view showing the control panel of a mobile telephone in which a method of allowing a user to enter characters and displaying the user-entered characters according to an embodiment of the present invention is implemented, through which the user can type in characters, and on which the user-entered characters can be displayed.

Referring next to FIG. 1, there is illustrated a plan view showing the control panel of a mobile telephone in which a method of allowing a user to enter characters and displaying the user-entered characters according to an embodiment of the present invention is implemented, through which the user can type in characters, and on which the user-entered characters can be displayed. In the figure, reference numeral 1 denotes the main body of the mobile telephone, 2 denotes the screen of a display such as a liquid crystal display, and 3 denotes a keypad. The keypad 3 includes a group of control keys such as a cursor key 5, a SEND key 6, an OK key 7, an END key 8, and a CLR key 9, in addition to ten number keys and special keys, such as a key "*" and a key "#", on a numeric keypad 4. The SEND key 6, the OK key 7, the END key 8, and the CLR key 9 are arranged around the cursor key 5, as shown in FIG. 1.

Figure 2:
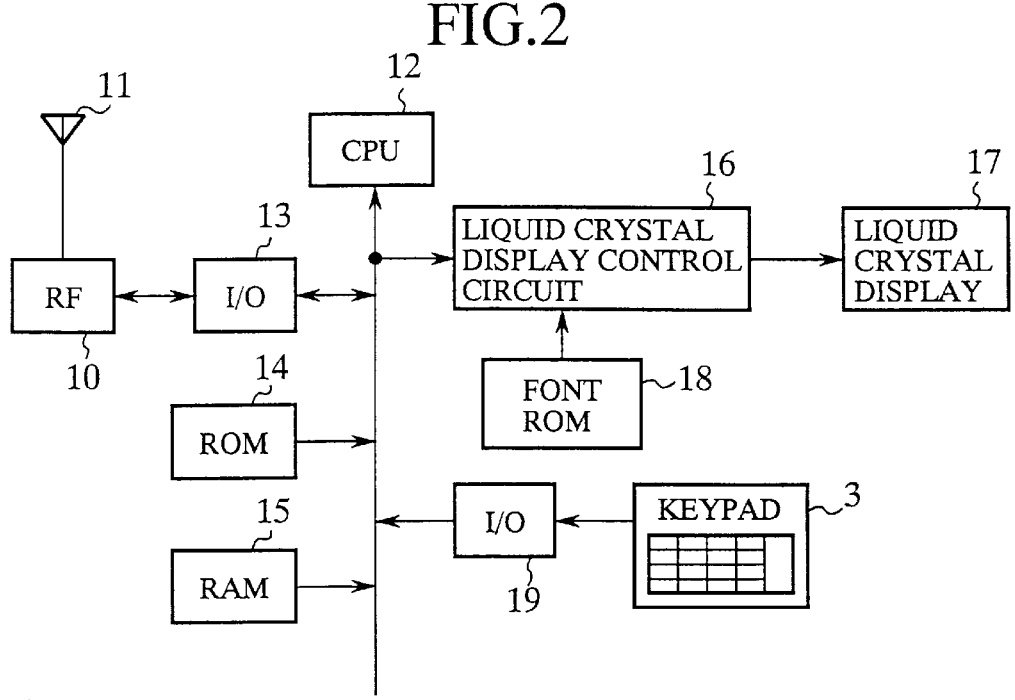
FIG. 2 is a block diagram showing the internal structure of the mobile telephone shown in FIG. 1.

Referring next to FIG. 2, there is illustrated a block diagram showing the internal structure of the mobile telephone shown in FIG. 1. In the figure, reference numeral 10 denotes an RF circuit connected to an antenna 11, 12 denotes a central processing unit or CPU disposed as a control circuit and connected to the RF circuit 10 by way of an input/output circuit 13, 14 denotes a ROM in which a control program for controlling the CPU 12 is stored, 15 denotes a RAM in which data needed for the control program to control the CPU are stored, 16 denotes a liquid crystal display control circuit for displaying data from the CPU 12 on a liquid crystal display 17, and 18 denotes a font ROM for storing font data to be furnished to the liquid crystal display control circuit 16. The keypad 3 is connected to the CPU 12 by way of the input/output circuit 19. The mobile telephone further comprises an audio circuit, not shown, including a microphone, a speaker, and so on.

Figure 3:
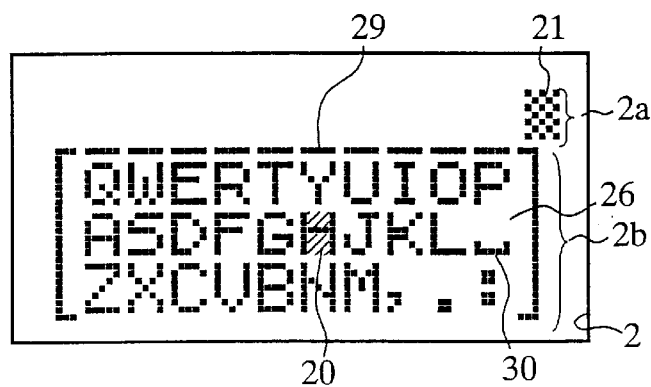
FIG. 3 is a front view showing an example of the screen of a display of the mobile telephone on which a software keyboard having an uppercase alphabetic key layout is displayed.
Figure 4:
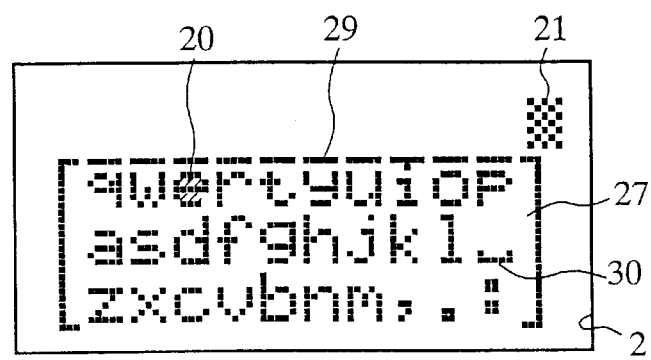
FIG. 4 is a front view showing another example of the screen of the display of the mobile telephone on which the software keyboard having a lowercase alphabetic key layout is displayed.
Figure 5:
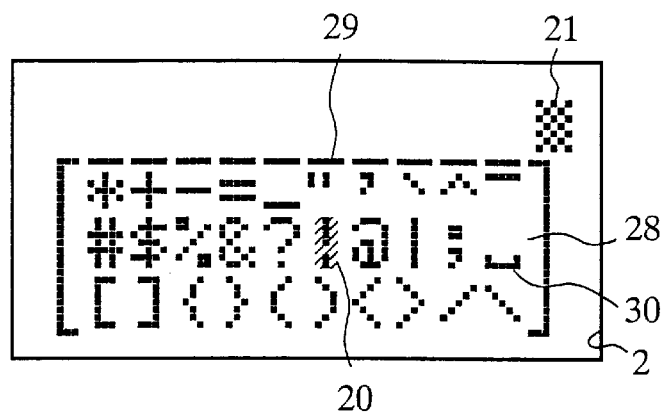
FIG. 5 is a front view showing another example of the screen of the display of the mobile telephone on which the software keyboard having a symbol character key layout is displayed.

The display screen 2 of the liquid crystal display 17 is divided into an input data display region 2a in which characters typed in or entered by a user are displayed, and a software keyboard display region 2b in which selectable characters are displayed as if they constitute an on-screen keyboard. By using the cursor key 5 and the OK key 7, the user can select one character displayed in the software keyboard display region 2b. The input data display region 2a can include at least one line of characters. The software keyboard display region 2b is comprised of three lines of characters. In the software keyboard display region 2b, any one of three sets of characters in an uppercase alphabetic screen font, in a lowercase alphabetic screen font, and in a symbol character screen font can be displayed, as shown in FIGS. 3, 4, and 5. In other words, the on-screen software keyboard can have three different layouts: uppercase and lowercase alphabetic key layouts 26 and 27 which are the same as the QWERTY typewriter layout, and a symbol character key layout 28. The font ROM 18 stores the uppercase and lowercase alphabetic fonts and the symbol character font therein. The ROM 14 stores layout information to define the three different layouts of the on-screen software keyboard, spacing between any two adjacent lines or rows of characters displayed in the software keyboard display region 2b, a boundary between the input data display region 2a and the software keyboard display region 2b, and so on.

Figure 8:
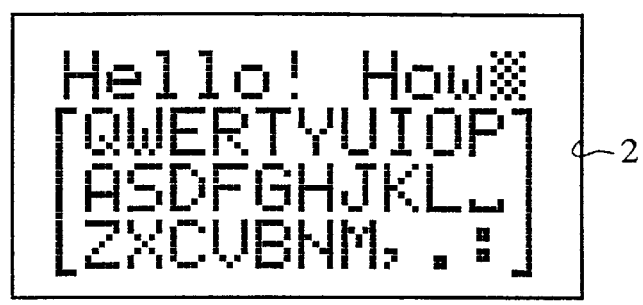
FIG. 8 is a front view showing a display screen illustrated for comparison with the example of the display screen as shown in FIG. 7.
Figure 9:
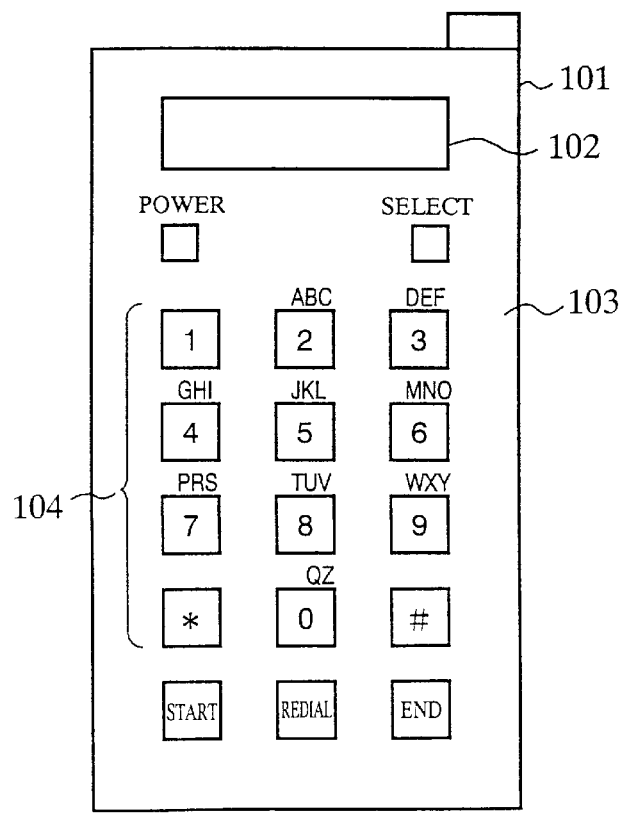
FIG. 9 is a plan view showing the control panel of a prior art mobile telephone through which a user can type in letters, and on which the user-entered letters can be displayed.
Figure 10:
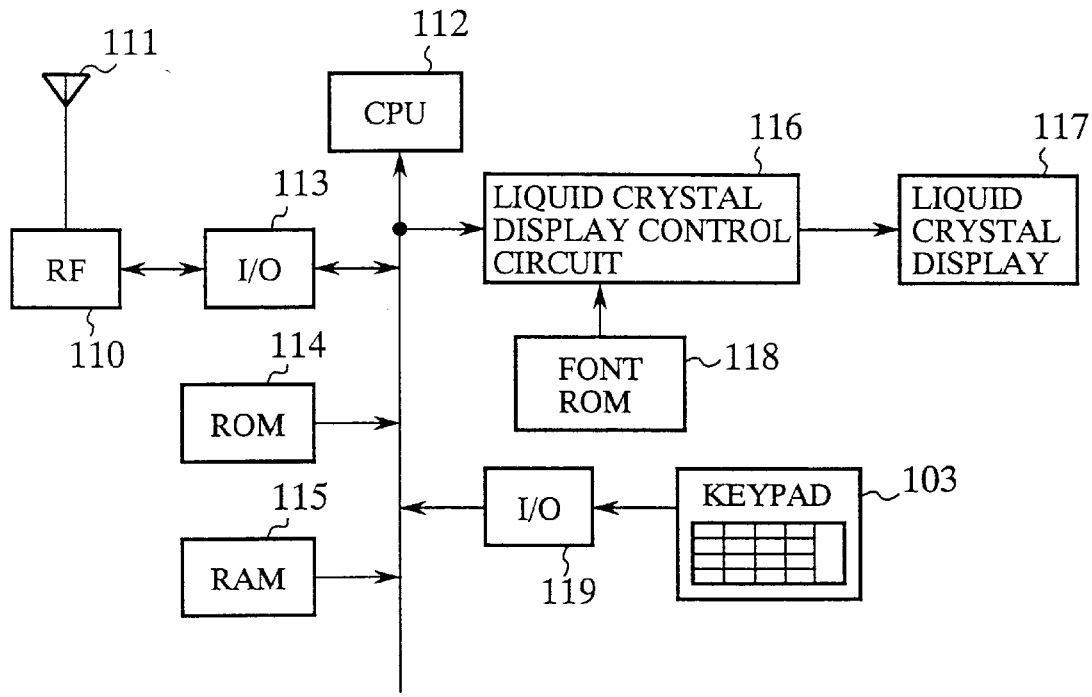
FIG. 10 is a block diagram showing the internal structure of the mobile telephone as shown in FIG. 9.
Figure 11:
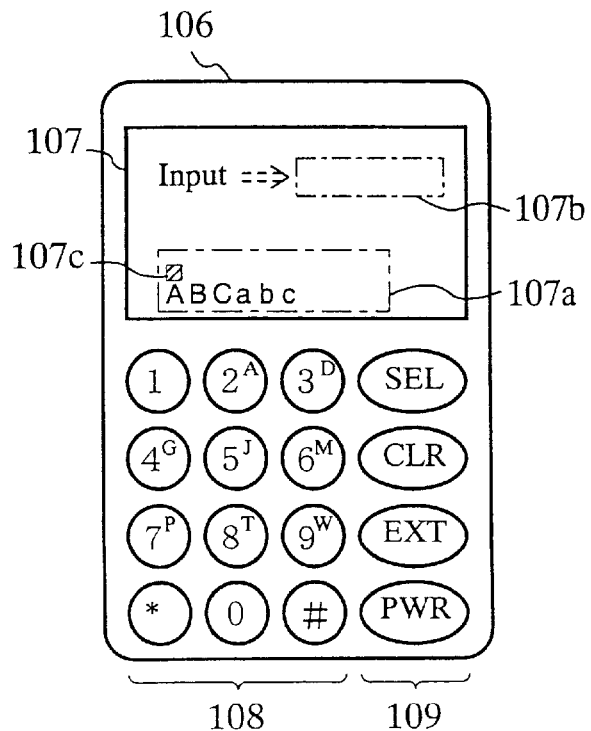
FIG. 11 is a plan view showing the control panel of another prior art mobile telephone through which a user can type in letters, and on which the user-entered letters can be displayed.

The screen 2 of the liquid crystal display can provide a plurality of lines each consisting of dot patterns of N pixels high. Therefore, if the screen font is built up on a matrix of (N−1) dots high by $M_1$ dots wide, there is no sufficient space between the input data display region 2a and the software keyboard region 2b, and between adjacent rows of characters in the software keyboard display region 2b, as shown in FIGS. 6b and 8. In this case, it is difficult for the user to distinguish between the software keyboard display region 2b and the input data display region 2a located above the software keyboard display region 2b.

Figure 6A:
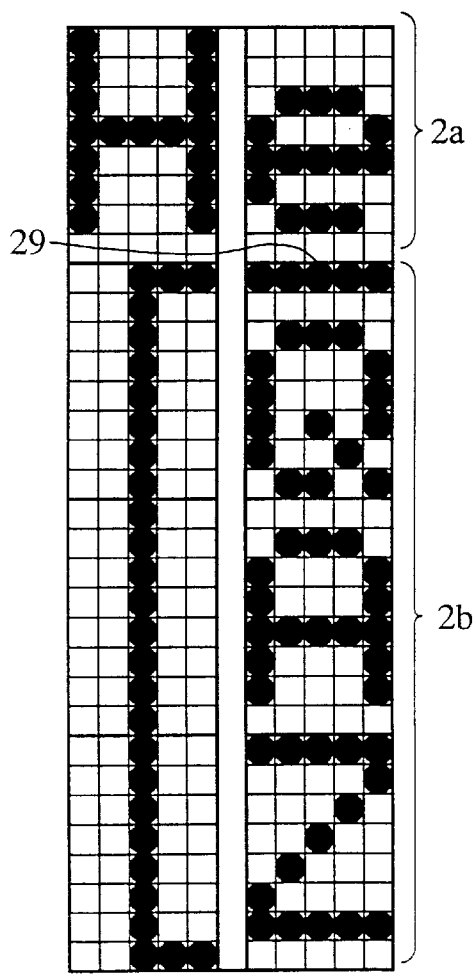
FIG. 6a is a partly enlarged front view showing in detail the layout of the software keyboard according to the embodiment of the present invention as shown in FIG. 3.
Figure 6B:
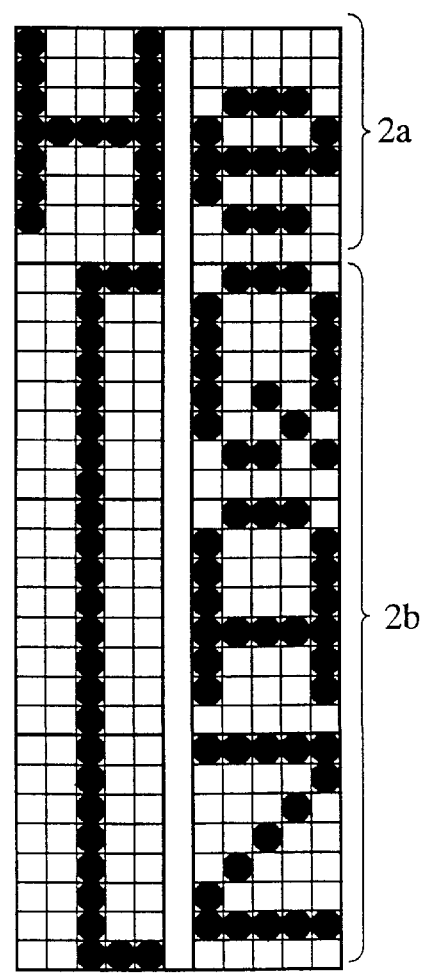

To solve the above problem, according to the method of this embodiment, the CPU 12 enables the liquid crystal display control circuit 16 to display characters typed in or entered by the user in the input data display region 2a by using a screen font built up on a matrix of (N−1) dots high by $M_1$ dots wide while providing a blank dot line of dots of 1 pixel high at the lowermost part of the input data display region 2a, display a dashed line of 1 dot high showing a boundary between the input data display region 2a and the software keyboard display region 2b at the top of the software keyboard display region 2b so that the boundary is adjacent to the input data display region 2a, provide a first blank dot line of dots of 1 pixel high just under the dashed-line boundary, display characters included in the first row of the on-screen software keyboard just under the first blank dot line by using a screen font built up on a matrix of (N−2) dots high by $M_1$ dots wide, provide a second blank dot line of dots of 1 pixel high just under the characters in the first row of the software keyboard, display characters included in the second row of the on-screen software keyboard just under the second blank dot line by using a screen font built up on a matrix of (N−2) dots high by $M_1$ dots wide, provide a third blank dot line of dots of 1 pixel high just under the characters in the second row of the on-screen software keyboard, display characters included in the third row of the on-screen software keyboard just under the third blank dot line by using a screen font built up on a matrix of (N−1) dots high by $M_1$ dots wide, and provide a fourth blank dot line of dots of 1 pixel high at the lowermost part of the software keyboard display region 2b, as shown in FIG. 6a. As a result, there are provided a space between user-entered characters displayed in the input data display region 2a and the software keyboard display region 2b, a space between the boundary and the first row of the software keyboard, a space between the first and second rows of the software keyboard, and a space between the second and third rows of the software keyboard.

When a user switches the mobile telephone into character input mode in order to enter a text, e.g., "Hello! How . . . " into the mobile telephone, the software keyboard having the uppercase alphabetic key layout 26 is displayed on the display screen 2 of the liquid crystal display 17. Then the user should move a cursor 20 shown in FIG. 3 to the position of the letter "H" in the software keyboard display region 2b first by manipulating the cursor key 5 and then press the OK key 7 so as to insert the letter "H" into the position designated by a cursor 21 displayed in the input data display region 2a, in this case, into the far-right part of the input data display region 2a. Once the user then presses the "*" key, the on-screen software keyboard switches from the uppercase alphabetic key layout 26 to the lowercase alphabetic key layout 27. After that, the user should move the cursor 20 to the position of the letter "e" within the software keyboard display region 2b by manipulating the cursor key 5 and then press the OK key 7 so as to enter and display the letter "e" just after the letter "H" already displayed in the input data display region 2a. Similarly, the user enters and displays the letters "l", "l", and "o" in the input data display region 2a. When the user further presses the "*" key, the on-screen software keyboard further switches from the lowercase alphabetic key layout 27 to the symbol character key layout 28. After that, the user should move the cursor 20 to the position of the symbol character "!" by manipulating the cursor key 5 and then press the OK key 7 so as to enter and display the symbol character "!" just after the letter "o" already displayed in the input data display region 2a.

When the user further presses the "*" key, the on-screen software keyboard switches from the symbol character key layout 28 to the uppercase alphabetic key layout 26. After that, the user should move the cursor 20 to the position of an on-screen space key 30 by manipulating the cursor key 5 and then press the OK key 7 so as to enter a space just after the symbol character "!" already displayed in the input data display region 2a. Furthermore, the user should move the cursor 20 to the position of the letter "H" by manipulating the cursor key 5 and then press the OK key 7 so as to enter and display the letter "H" after the space. After that, when the user presses the "*" key, the on-screen software keyboard switches from the uppercase alphabetic key layout 26 to the lowercase alphabetic key layout 27. Then the user should move the cursor 20 to the position of the letter "o" by manipulating the cursor key 5 and then press the OK key 7 so as to enter and display the letter "o" just after the letter "H". Furthermore, the user should move the cursor 20 to the position of the letter "w" by manipulating the cursor key 5 and then press the OK key 7 so as to enter and display the letter "w" just after the letter "o". As a result, the text "Hello! How" appears in the input data display region 2a.

Figure 7:
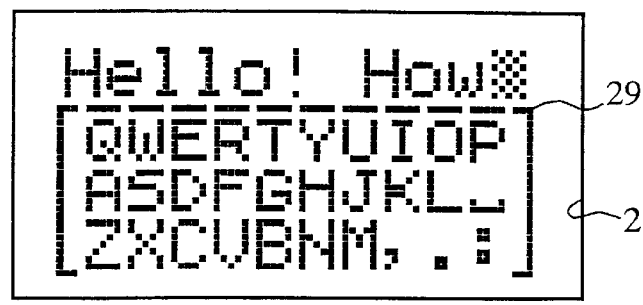
FIG. 7 is a front view showing an example of the screen of the display of the mobile telephone on which both the software keyboard having the uppercase alphabetic key layout as shown in FIG. 3 and user-entered characters are displayed.

As previously explained, when the CPU 12 enables the display control circuit 16 to display the software keyboard in the software keyboard region 2b, it provides a blank dot pattern of 1 dot high at the lowermost part of the input data display region 2a, and displays the dashed line 29 of 1 dot high showing the boundary between the input data display region 2a and the software keyboard display region 2b at the top of the software keyboard display region 2b, as shown in FIGS. 6a and 7. The CPU 12 further enables the display control circuit 16 to display the software keyboard in the software keyboard display region 2b in such a manner as to allow a blank dot pattern of 1 dot high between the boundary dot pattern 29 and the on-screen software keyboard, and allow a blank dot pattern of 1 dot high between any two adjacent rows of the software keyboard, according to the layout information stored in the ROM 14. Accordingly, the user can easily distinguish between the input data display region 2a and the software keyboard display region 2b and then easily enter characters without making typing errors.

If the user presses the left cursor key part of the cursor key 5 when the cursor 20 is located at the far-left character on any one of the rows of the software keyboard in the software keyboard display region 2b, the CPU 12 enables the display control circuit 16 to move the cursor 20 to the far-right character on the same row of the software keyboard. Similarly, if the user presses the right cursor key part of the cursor key 5 when the cursor 20 is located at the far-right character on any one of the rows of the software keyboard, the CPU 12 enables the display control circuit 16 to move the cursor 20 to the far-left character on the same row of the software keyboard in the software keyboard region 2b. Accordingly, if each of the first through third rows of the on-screen software keyboard includes ten characters, as shown in FIGS. 3 through 5, the user can move the cursor 20 to the position of a desired character with five or less touches of the cursor key.

The user can easily enter a numeric character only by pressing a corresponding number key in character input mode. Alternatively, there is an idea of providing the on-screen software keyboard with a numeric key layout so that the user can select a desired numeric character on-screen by manipulating the cursor key 5 and then pressing the OK key 7, in order to secure unity in key operation for entering characters. However, it is inconvenient to enter numeric characters by manipulating the cursor key 5 and then pressing the OK key 7.

In a variant of the exemplary embodiment shown, there is provided a user interface to allow the user to switch the on-screen software keyboard from a key layout to another key layout by pressing the down cursor key part of the cursor key 5 while the cursor 20 is located at the lowermost row of the software keyboard, or by pressing the up cursor key part of the cursor key 5 while the cursor 20 is located at the top row of the software keyboard, instead of pressing the "*" key.

There are two ways of switching between character input mode, as mentioned above, wherein the user can move the cursor 20 within the software keyboard display region 2b by touching the cursor key 5, and edit mode wherein the user can move the cursor 21 within the input data display region 2a by touching the cursor key 5, as follows:

(1) When the user presses the OK key in edit mode, the mobile telephone is switched to character input mode. On the other hand, when the user presses the CLR key in character input mode, the mobile telephone is switched to edit mode. In either mode, the user should press the SEND key in order to confirm the user-entered text.

(2) Every time the user presses the "#" key, the mobile telephone is switched between edit mode and character input mode.

As previously mentioned, the embodiment of the present invention makes it possible for users to enter characters easily and speedily without making typing errors while surely distinguishing user-entered characters from the on-screen software keyboard by the provision of the boundary dot pattern 29 between the input data display region 2a and the software keyboard display region 2b, compared with the case where there is no boundary on-screen between the input data display region 2a and the software keyboard display region 2b, as shown in FIGS. 6b and 8. Recent years have seen available mobile telephones having a function of sending a character message including letters. The method of the embodiment is particularly effective in enhancing the function of sending a character message. Accordingly, the user can generate and send a character message such as "Hello ! How are you ?" easily by using the method of the embodiment. Furthermore, since the on-screen software keyboard can switch among the three different layouts: the uppercase and lowercase alphabetic key layouts, and the symbol character key layout, the user can send all ASCII characters by using the software keyboard. This feature comes in very handy when the user sends a E-mail.

Furthermore, since there is provided a space between any tow adjacent rows of the on-screen software keyboard, the user can easily recognize the key layout of the software keyboard and easily search for a desired key or character. In addition, since the uppercase and lowercase alphabetic key layouts of the software keyboard are the same as the QWERTY typewriter layout which has been widely used as the key layout of keyboards attached to personal computers, mobile telephones, and the like, the user can easily manipulate the software keyboard.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of allowing a user to enter characters into electronic equipment by selecting a character on a software keyboard displayed on a display screen of said electronic equipment using a cursor key, and displaying characters selected by the user on said display screen, comprising the steps of:

providing an input data display region comprised of at least one line, in which characters selected by the user are displayed, within said display screen;

providing a software keyboard display region comprised of a plurality of lines, in which said software keyboard is displayed, within said display screen; and providing a dot pattern display on said display screen showing a boundary between said input data display region and said software keyboard display region, wherein each line of said display screen consists of dot patterns of N pixels high, N being an integer greater than three, wherein in performing said providing steps, within a first line of said software keyboard display region, a dot pattern of 1 dot high showing said boundary between said input data display region and said software keyboard display region is displayed at the top of said first line of said software keyboard display region so that said boundary is adjacent to said input data display region, a first blank dot line of dots of 1 pixel high is provided just under said boundary, and a first row of keys or characters on said software keyboard is displayed just under said first blank dot line by using a screen font built up on a matrix of (N−2) dots high by $M_1$ dots wide, $M_1$ being an integer greater than one, so that said boundary and said first row of said software keyboard are spaced from each other, wherein within a second line of said software keyboard display region, a second blank dot line of dots of 1 pixel high is provided just under said first line of said software keyboard display region and a second row of keys or characters on said software keyboard is displayed just under said second blank dot line by using a screen font built up on a matrix of (N−2) dots high by $M_1$ dots wide so that said first and second rows of said software keyboard are spaced from each other, and a third blank dot line of dots of 1 pixel high is provided just under said second row of said software keyboard, and wherein within a third line of said software keyboard display region, a third row of keys or characters on said software keyboard is displayed just under said third blank dot line by using a screen font built up on a matrix of (N−1) dots high by $M_1$ dots wide so that said second and third rows of said software keyboard are spaced from each other, and a fourth blank dot line of dots of 1 pixel high is provided at the lowermost part of said third line of said software keyboard display region.

2. The method according to claim 1, wherein in performing said step of providing said input data display region, characters selected by the user are displayed by using a screen font built up on a matrix of (N−1) dots high by $M_1$ dots wide, and a blank dot line of dots of 1 pixel high is provided at the lowermost part of said input data display region so that characters displayed in said input data display region and said boundary displayed in said software keyboard display region are spaced from each other.

3. The method according to claim 1, wherein said software keyboard has a key layout which is the same as the QWERTY typewriter layout.

4. The method according to claim 1, wherein said software keyboard has three different key layouts: an uppercase alphabetic key layout, a lowercase alphabetic key layout, and a special symbol key layout, and wherein said software keyboard can switch among the three different key layouts in response to manipulation by a user.

* * * * *